United States Patent [19]

Allison, Jr.

[11] Patent Number: 4,556,188
[45] Date of Patent: Dec. 3, 1985

[54] SECURITY PLATFORM ASSEMBLY FOR COMPUTERS AND OTHER ELECTRICAL APPLIANCES

[76] Inventor: Irving Allison, Jr., 16884 Greenfield, Detroit, Mich. 48219

[21] Appl. No.: 575,076

[22] Filed: Jan. 30, 1984

[51] Int. Cl.[4] ............................................. F16M 13/00
[52] U.S. Cl. .......................................... 248/553; 70/58
[58] Field of Search ............... 248/551, 552, 553, 500; 70/58, 63, 62, 71, 232, DIG. 7, DIG. 57, DIG. 58; 109/52; 211/4, 8

[56] References Cited

U.S. PATENT DOCUMENTS

| | | | |
|---|---|---|---|
| 1,912,872 | 6/1933 | Trautner et al. | 70/232 X |
| 2,800,601 | 7/1957 | Martin et al. | 70/232 UX |
| 3,423,971 | 1/1969 | Brunelli | 70/232 X |
| 3,664,616 | 5/1972 | Raskin | 248/553 |
| 3,672,190 | 6/1972 | Palazzolo | 70/232 X |
| 3,743,224 | 7/1973 | Singer | 248/553 |
| 3,744,282 | 7/1973 | Hemphill | 70/58 |
| 4,007,613 | 2/1977 | Gassaway | 70/58 |
| 4,325,531 | 4/1982 | Omholt | 248/553 |

Primary Examiner—J. Franklin Foss
Attorney, Agent, or Firm—Cullen, Sloman, Cantor, Grauer, Scott, & Rutherford

[57] ABSTRACT

In combination with the computer of other electrical appliance having a base which is mountable upon a support having an undersurface, there is provided a security platform for anchoring and locking the computer to the support. The security platform comprises a pair of spaced platform bars bearing against the base, each bar having a first pair of apertures therethrough with fasteners projecting up therethrough, and threaded into the base for securing the bars to the base. Each bar has a second pair of apertures for receiving a pair of bolts which extend downwardly therethrough and through corresponding bores in the support. Fasteners are threaded onto the bolts in snug retaining registry with the support. Spaced apertured detent plates underlie each anchor bar with one aperture receiving a bolt. A lock assembly bears against each detent plate protectively encloses the adjacent fastener and includes a key operated cylinder lock having a cam retainer for projection through the retainer plate and secured thereto. The bolts may be integral with the platform bar.

2 Claims, 5 Drawing Figures

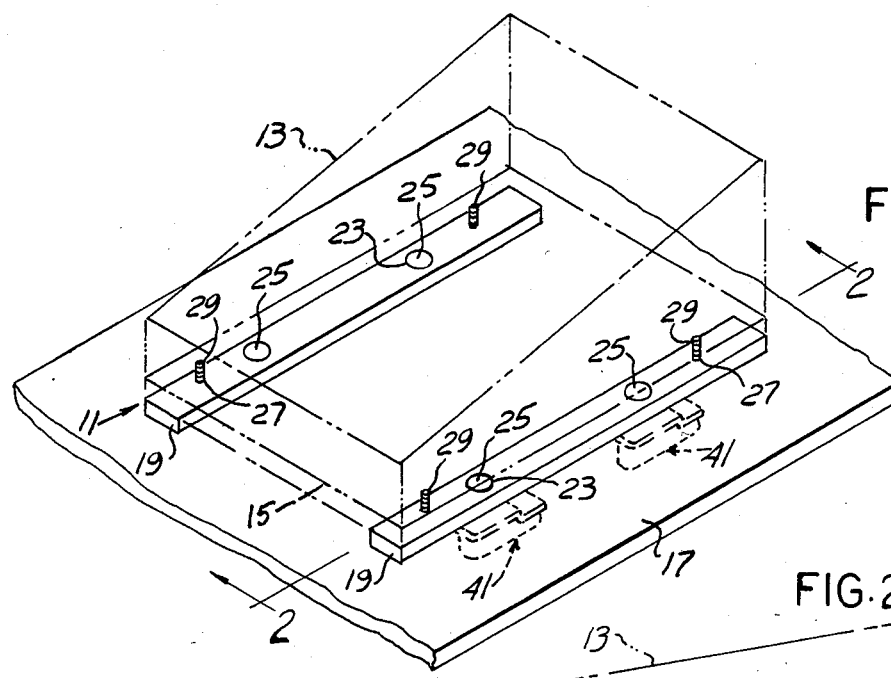
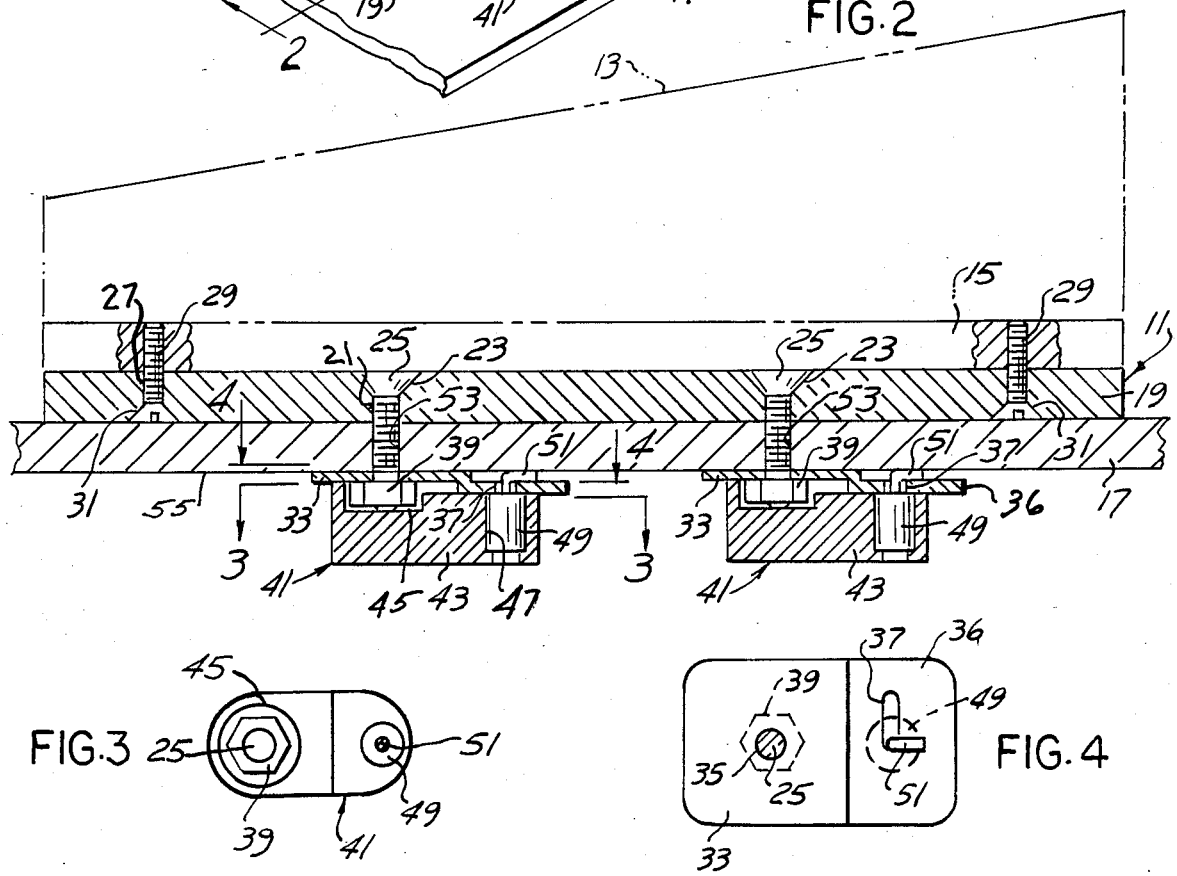
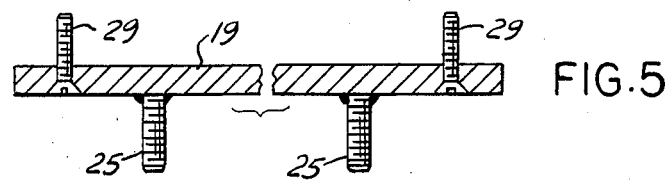

SECURITY PLATFORM ASSEMBLY FOR COMPUTERS AND OTHER ELECTRICAL APPLIANCES

BACKGROUND OF THE INVENTION

Heretofore and presently computers and other electrical equipment are unlawfully lifted from a supporting table and carried away. The unlawful removal of computers, typewriters, and other equipment from the home or business or from other buildings including schools and hotels is directed to any other electrical appliance which is portable as for example, T.V. sets, computer components, tape decks, radios, record players and the like. Thus, there has existed a need for a means of anchoring, securing and locking such computer or other electrical appliance to a table, dresser or other support. There is a need for an anchor and construction as will at least hinder, delay, or prevent unauthorized theft of such equipment.

SUMMARY OF THE INVENTION

An important feature of the present invention is to provide a security platform assembly which is adapted for securing to the base of a computer or other electrical appliance and at the same time adapted for securing to a support, table, dresser or counter.

A further feature contemplates the use of one or more platform bars bearing against the base of a computer or the like and secured thereto a pair of fasteners and wherein each security platform includes a pair of depending bolts retained against the undersurface of the computer base which project downwardly through the security platform and are adapted for projection through corresponding bores in a table or other support.

Another feature includes a pair of fasteners or nuts threaded onto the bolts adapted for snug operative engagement with the undersurface of the support, and wherein the security platform so anchored to the appliance and to the support prevents or delay or renders difficult the unlawful or illegal removal of said appliance from the support.

A further feature contemplates a means for locking the corresponding platform bar to said base and wherein an apertured detent plate at one end receives a bolt retained by its fastener. There is provided a lock assembly which bears against the undersurface of the detent plate and platform bar recessed to protectively enclose the fastener and having mounted therein a key operated cylinder lock whose cam retainer projects through an apertured portion of the detent plate by which the lock assembly body is secured to the platform bar preventing access to the nuts or fasteners.

These and other features and objects will be seen from the following Specification and claims in conjunction with the appended drawings.

THE DRAWINGS

FIG. 1 is a perspective view of a computer mounted upon a support and secured thereto by the present security platform assembly.

FIG. 2 is a longitudinal section taken in the direction of arrows 2—2 of FIG. 1 on an increased scale.

FIG. 3 is a section taken in the direction of arrows 3—3 of FIG. 2.

FIG. 4 is a section taken in the direction of arrows 4—4 of FIG. 2.

FIG. 5 is a side elevational view of a modified anchor bar.

It will be understood that the above drawing illustrates merely a preferred embodiment of the invention and that other embodiments are contemplated within the scope of the claims hereafter set forth.

DETAILED DESCRIPTION OF AN EMBODIMENT OF THE INVENTION

Referring to the drawing, the present security platform 11 for computers or other electrical appliances is shown in FIG. 1 and in longitudinal section on an increased scale in FIG. 2. While the present security platform assembly is initially designed for anchoring and securing a computer to a suitable support, it is contemplated that the present security platform could be used for almost any other type of electrical appliance or device which has a base including such devices as computer components, T.V. sets, tape decks, record players, typewriters and the like.

In the illustrative embodiment, there is schematically shown the computer 13, FIGS. 1 and 2, having a conventional apertured base 15 shown in FIG. 2. Base 15 may be in the form of a plate or a strip or strips and may be of any desired shape of a suitable material such as wood or metal.

The computer and/or other appliance base is adapted for positioning upon a suitable table top, shelf, dresser, or platform, hereafter referred to as support 17. The present security platform assembly 11 includes one or a pair of laterally spaced platform bars 19, FIG. 2 which may be parallel.

Each of the platform bars 19, FIG. 1, has a pair of longitudinally spaced bolt holes 21, countersunk at their upper ends as at 23. A pair of bolts 25, sometimes referred to as hold down bolts, extend through bolt holes 21 with their heads nested within the counter-sinks 23 respectively. The bolts extend downwardly through platform bar 19, through support 17, and are adapted to receive nuts or fasteners 39.

Formed through the platform bar 19 are a pair of longitudinal spaced apertures or screw holes 27. Screws 29 project upwardly through said apertures and threadedly engage the appliance or computer base 15, FIG. 3. In the event that the base 15 is formed of sheet metal with apertures therein, the screws employed would be sheet metal screws functioning to secure the underlying platform bar or bars 19 to the undersurface of base 15, FIG. 3.

The screw apertures 27 at one end have counter-sinks at 31 to receive the heads of the corresponding screws 29 to permit the snug mounting of the platform bar 19 upon support 17. While a pair of bolt holes 21 are formed through platform bar 19, it is contemplated for possible use that there could be only one aperture 21 therethrough for receiving a bolt 25 and a corresponding nut 39, as a means of anchoring the platform bar 19 to the support 17.

In the illustrative embodiment, there are employed a pair of laterally spaced platform bars 19 secured to the undersurface of base 15 by screw fasteners 29. Bars 19 are parallel.

In one mode of use of the present security platform employing the pair of bolts 25 for each platform bar, there may be employed a corresponding plurality of fasteners or nuts 39 which are threaded onto the respective bolts 25 and snugly and retainingly bear against the undersurface 55 of support 17. This alone secures the corresponding platform bars to support 17 and will be sufficient in many cases for deterring the would be thief or at least delay separation of the appliance from the support, since it would least require the use of a wrench.

It is contemplated in a preferred embodiment of the invention that in addition to the bolts 25 there are provided upon the underside of the respective anchor platform bars 19 a pair of longitudinally spaced apertured detent plates 33. Each dentent plate adjacent one end has an aperture 35 adapted to receive a bolt 25. Each detent plate has a vertically displaced end 36 with a cam retainer aperture 37 therethrough, FIGS. 2 and 4.

A pair of longitudinally spaced lock assemblies 41 are mounted upon each of the platform bars 19 and suitably secured thereto. For this purpose, each lock assembly includes a body 43 which is recessed at 45 upon one side to protectively enclose the corresponding fastener 39.

Body 43 includes an upright bore 47 within which is nested and retained the key operated cylinder lock 49. Said lock includes a suitable tumbler assembly terminating at one end in the rotatable cam 51, FIGS. 2, 3 and 4. With the corresponding lock body 43 bearing against the undersurface of the detent plate 33, the corresponding cam detent 51 upon the cylinder lock projects upon through the cam retainer aperture 37 in the offset end 36 of said detent plate and is adapted to operatively and retainingly engage said detent plate.

In the illustrative embodiment if the cam retainer 51 is rotated to an unlocked position, such as 90° counterclockwise from a position shown in FIG. 4, said cam retainer will disengage from detent plate 33. In the illustrative embodiment there are mounted upon the undersurface of the corresponding platform bar 19, a pair of longitudinally spaced lock assemblies 41. Each of the respective lock assemblies is recessed on one side to protectively enclose the corresponding fastener 39 to prevent access thereto by a wrench. The lock assemblies additionally have a cylinder lock by which the corresponding bodies 43 of the lock assemblies are snugly secured to the undersurface of the platform bar.

While one such lock assembly 41 could be employed even with a pair of platform bars, it is contemplated in the preferred embodiment that there be a pair of such lock assemblies 41 underlying and secured to each of the respective platform bars. It is contemplated that the bolts or studs 25 depend from and are fixedly secured to plate 19, as by welding or otherwise. In that case the spaced bolt apertures are omitted, FIG. 5.

Having described my invention, reference should now be had to the following claims:

I claim:

1. In combination with a computer or other electrical appliance having a base mountable upon a support having an undersurface;
   a security platform assembly for anchoring said computer to said support, comprising;
   a platform bar bearing against said base;
   said bar having a first pair of spaced apertures therethrough;
   fasteners projecting up through said apertures and threaded into said base for securing said bar to said base;
   said bar having at least one bolt aperture therethrough;
   a bolt extending downwardly through the bolt aperture and through a corresponding bore through said support;
   a fastener threaded onto said bolt in snug retaining registry with the undersurface of said support;
   a detent plate spaced from said platform bar and underlying said support having a bolt aperture therethrough receiving said bolt, and spaced therefrom a cam retainer aperture;
   one end of the detent plate including said cam retainer aperture being off set and spaced from the adjacent support;
   and a lock assembly underlying and engaging said detent plate, said lock assembly including a body recessed on one side protectively enclosing said fastener;
   and a key operated cylinder lock nested within and extending through said body including a rotatable cam projected through said cam retainer aperture retainingly engaging said detent plate for securing said lock assembly to said platform bar preventing access to said fastener.

2. In combination with a computer or other electrical appliance having a base mountable upon a support having an undersurface;
   a security platform assembly for anchoring said computer to said support, comprising;
   a platform bar bearing against said base;
   said bar having a pair of spaced apertures therethrough;
   fasteners projecting up through said apertures and threaded into said base for securing said bar to said base;
   a bolt secured to and depending from said bar and extending through a corresponding bore in said support;
   a fastener threaded onto said bolt in snug retaining registry with the undersurface of said support;
   a detent plate spaced from said platform bar and underlying said support having a bolt aperture therethrough receiving said bolt, and spaced therefrom a cam retainer aperture;
   one end of the detent plate including said cam retainer aperture being offset and spaced from the adjacent support;
   and a lock assembly underlying and engaging said detent plate, said lock assembly including a body recessed on one side protectively enclosing said fastener;
   and a key operated cylinder lock nested and secured within and extending through said body including a rotatable cam projected through said cam retainer aperture retainingly engaging said detent plate for securing said lock assembly to said platform bar preventing access to said fastener.

* * * * *